(12) United States Patent
Shih et al.

(10) Patent No.: US 9,719,034 B2
(45) Date of Patent: Aug. 1, 2017

(54) CO-PRODUCTION OF LUBRICANTS AND DISTILLATE FUELS

(71) Applicants: Stuart S. Shih, Gainesville, VA (US); Gary P. Schleicher, Milford, NJ (US); Michael B. Carroll, Center Valley, PA (US); Timothy L. Hilbert, Middleburg, VA (US); Stephen J. McCarthy, Center Valley, PA (US); William J. Novak, Bedminster, NJ (US)

(72) Inventors: Stuart S. Shih, Gainesville, VA (US); Gary P. Schleicher, Milford, NJ (US); Michael B. Carroll, Center Valley, PA (US); Timothy L. Hilbert, Middleburg, VA (US); Stephen J. McCarthy, Center Valley, PA (US); William J. Novak, Bedminster, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 123 days.

(21) Appl. No.: 14/546,565

(22) Filed: Nov. 18, 2014

(65) Prior Publication Data
US 2015/0175911 A1 Jun. 25, 2015

Related U.S. Application Data

(60) Provisional application No. 61/919,919, filed on Dec. 23, 2013.

(51) Int. Cl.
| | | |
|---|---|---|
| C10G 45/64 | (2006.01) | |
| C10G 69/02 | (2006.01) | |
| C10M 103/06 | (2006.01) | |
| B01J 35/10 | (2006.01) | |
| C10G 65/04 | (2006.01) | |
| C10G 65/12 | (2006.01) | |
| B01J 23/883 | (2006.01) | |
| B01J 23/888 | (2006.01) | |
| B01J 29/78 | (2006.01) | |

(52) U.S. Cl.
CPC ............ *C10G 69/02* (2013.01); *B01J 23/883* (2013.01); *B01J 23/888* (2013.01); *B01J 29/78* (2013.01); *B01J 29/7846* (2013.01); *B01J 29/7861* (2013.01); *B01J 29/7884* (2013.01); *B01J 29/7892* (2013.01); *B01J 35/1014* (2013.01); *C10G 65/043* (2013.01); *C10G 65/12* (2013.01); *C10M 103/06* (2013.01); *B01J 2229/186* (2013.01); *B01J 2229/20* (2013.01); *B01J 2229/42* (2013.01); *C10G 2300/1048* (2013.01); *C10G 2300/203* (2013.01); *C10G 2300/301* (2013.01); *C10G 2300/302* (2013.01); *C10G 2300/307* (2013.01); *C10G 2400/04* (2013.01); *C10G 2400/10* (2013.01)

(58) Field of Classification Search
CPC .............................. C10G 45/64; C10G 69/02
See application file for complete search history.

(56) References Cited

U.S. PATENT DOCUMENTS

| | | | | |
|---|---|---|---|---|
| 4,283,271 | A | | 8/1981 | Garwood et al. |
| 4,642,176 | A | * | 2/1987 | Adams ............... C10G 45/64 208/111.3 |
| 5,053,117 | A | * | 10/1991 | Kyan ................. C10G 45/64 208/111.35 |
| 5,985,132 | A | | 11/1999 | Hoehn et al. |
| 6,432,297 | B1 | | 8/2002 | Kalnes et al. |
| 6,569,313 | B1 | | 5/2003 | Carroll et al. |
| 6,623,624 | B2 | | 9/2003 | Cash et al. |
| 6,884,339 | B2 | | 4/2005 | Benazzi et al. |
| 7,077,948 | B1 | * | 7/2006 | Barre ................. C10G 45/64 208/111.01 |
| 7,300,900 | B2 | | 11/2007 | Benazzi et al. |
| 8,231,778 | B2 | | 7/2012 | Gala |
| 2010/0187155 | A1 | * | 7/2010 | McCarthy ............ C10G 45/12 208/58 |
| 2011/0174684 | A1 | * | 7/2011 | Prentice ................ C10G 45/64 208/97 |
| 2011/0315599 | A1 | | 12/2011 | Prentice et al. |
| 2013/0066122 | A1 | | 3/2013 | Joseck et al. |

FOREIGN PATENT DOCUMENTS

WO 2013085533 A1 6/2013

OTHER PUBLICATIONS

The International Search Report and Written Opinion of PCT/US2014/066307 dated Jan. 30, 2015.
Johnson, Marvin F.L., "Estimation of the Zeolite Content of a Catalyst from Nitrogen Adsorption Isotherms," Journal of Catalysis, 1978, vol. 52, pp. 425-431.

* cited by examiner

*Primary Examiner* — Randy Boyer
(74) *Attorney, Agent, or Firm* — Robert A. Migliorini; Scott F. Yarnell

(57) ABSTRACT

Methods are provided for processing a gas oil boiling range feedstock, such as a vacuum gas oil, in a single reaction stage and/or without performing intermediate separations. The methods are suitable for forming lubricants and distillate fuels while reducing or minimizing the production of lower boiling products such as naphtha and light ends. The methods can provide desirable yields of distillate fuels and lubricant base oils without requiring separate catalyst beds or stages for dewaxing and hydrocracking. The methods are based in part on use of a dewaxing catalyst that is tolerant of sour processing environments while still providing desirable levels of activity for both feed conversion and feed isomerization.

19 Claims, No Drawings

CO-PRODUCTION OF LUBRICANTS AND DISTILLATE FUELS

CROSS-REFERENCE TO RELATED APPLICATIONS

This application claims priority to U.S. Provisional Application Ser. No. 61/919,919 filed Dec. 23, 2013, which is herein incorporated by reference in its entirety.

FIELD

Systems and methods are provided for production of lubricant oil basestocks and distillate fuels.

BACKGROUND

Hydrocracking of hydrocarbon feedstocks is often used to convert lower value hydrocarbon fractions into higher value products, such as conversion of vacuum gas oil (VGO) feedstocks to diesel fuel and lubricants. Typical hydrocracking reaction schemes can include an initial hydrotreatment step, a hydrocracking step, and a post hydrotreatment step. After these steps, the effluent can be fractionated to separate out a desired diesel fuel and/or lubricant oil basestock.

One way to improve the yield of a desired product is to use catalytic dewaxing to modify heavier molecules. Unfortunately, conventional methods for producing low pour point or low cloud point diesel fuel and/or lubricant oil basestock are hindered due to differing sensitivities for the catalysts involved in the various stages. This limits the selection of feeds which are potentially suitable for use in forming dewaxed diesel and/or Group II or higher basestocks. In conventional processing, the catalysts used for the hydroprocessing and hydrocracking of the oil fraction often have a relatively high tolerance for contaminants such as sulfur or nitrogen. By contrast, catalysts for catalytic dewaxing usually suffer from a low tolerance for contaminants. In particular, dewaxing catalysts that are selective for producing high yields of diesel and high yields and high VI lube oil and are intended to operate primarily by isomerization are typically quite sensitive to the amount of sulfur and/or nitrogen present in a feed. If contaminants are present, the activity, distillate selectivity and lubricating oil yield of the dewaxing catalyst will be reduced.

To accommodate the differing tolerances of the catalysts, a catalytic dewaxing step is often segregated from other hydroprocessing steps. In addition to requiring a separate reactor for the catalytic dewaxing, this segregation requires costly facilities and is inconvenient as it dictates the order of steps in the hydroprocessing sequence.

U.S. Pat. No. 8,231,778 describes a method for hydrocracking a feed to produce lubricant base oils and various fuels. The hydrocracking is performed in the presence of a catalyst composed of zeolite Beta, Y zeolite, or MFI zeolite. The metals supported on the catalyst can include non-noble Group VIII metals. It is noted that feeds can be hydrotreated prior to exposure to the hydrocracking catalyst in order to reduce the sulfur content of the feed to 500 wppm or less.

U.S. Patent Application Publication 2011/0315599 describes methods for using hydrocracking and dewaxing processes to produce lubricants and fuels. Various configurations are described for hydrotreating, hydrocracking, and/or dewaxing of feeds. Suitable hydrocracking catalysts are described as amorphous silica-alumina with supported metals, zeolite Y, or acidified alumina.

U.S. Pat. No. 6,884,339 describes a method for processing a feed to produce a lubricant base oil and optionally distillate products. A feed is hydrotreated and then hydrocracked without intermediate separation. An example of the catalyst for hydrocracking can be a supported Y or beta zeolite. The catalyst also includes a hydro-dehydrogenating metal, such as a combination of Ni and Mo. The hydrotreated, hydrocracked effluent is then atmospherically distilled. The portion boiling above 340° C. is catalytically dewaxed in the presence of a bound molecular sieve that includes a hydro-dehydrogenating element. The molecular sieve can be ZSM-48, EU-2, EU-11, or ZBM-30. The hydro-dehydrogenating element can be a noble Group VIII metal, such as Pt or Pd.

U.S. Pat. No. 7,300,900 describes a catalyst and a method for using the catalyst to perform conversion on a hydrocarbon feed. The catalyst includes both a Y zeolite and a zeolite selected from ZBM-30, ZSM-48, EU-2, and EU-11. Examples are provided of a two stage process, with a first stage hydrotreatment of a feed to reduce the sulfur content of the feed to 15 wppm, followed by hydroprocessing using the catalyst containing the two zeolites. An option is also described where it appears that the effluent from a hydrotreatment stage is cascaded without separation to the dual-zeolite catalyst, but no example is provided of the sulfur level of the initial feed for such a process.

SUMMARY

In an aspect, a method for producing a diesel fuel and a lubricant basestock is provided. The method includes contacting a feedstock having a T95 boiling point of 1100° F. (593° C.) or less and comprising at least 100 wppm of sulfur with a dewaxing catalyst under effective conversion conditions to produce a converted effluent, the effective conversion conditions being effective for at least 25% conversion of the feedstock relative to a conversion temperature of 370° C., the dewaxing catalyst comprising a unidimensional, 10-member ring pore molecular sieve, at least one Group VI metal, at least one Group VIII metal, and a binder having a binder surface area of 100 $m^2/g$ or less, such as 80 $m^2/g$ or less, or 70 $m^2/g$ or less; contacting at least a portion of the converted effluent with a supported hydrotreating catalyst under effective hydrotreating conditions to produce a product effluent, the hydrotreating catalyst comprising at least one Group VI metal and at least one Group VIII metal; and fractionating the converted, hydrotreated effluent to form at least a distillate fuel product fraction and a lubricant base oil product fraction.

DETAILED DESCRIPTION

All numerical values within the detailed description and the claims herein are modified by "about" or "approximately" the indicated value, and take into account experimental error and variations that would be expected by a person having ordinary skill in the art.

Overview

In various embodiments, methods are provided for processing a gas oil boiling range feedstock, such as a vacuum gas oil, in a single reaction stage and/or without performing intermediate separations. The methods are suitable for forming lubricants and distillate fuels while reducing or minimizing the production of lower boiling products such as naphtha and light ends. The methods can provide desirable yields of distillate fuels and lubricant base oils without requiring separate catalyst beds or stages for dewaxing and hydrocracking. Additionally, in some aspects the yield of lubricant base oils is improved by exposing the feedstock to a dewaxing catalyst under effective conversion conditions prior to exposing the feedstock to a hydrotreating catalyst under effective hydrotreating conditions. Still another advantage is that the resulting distillate fuel products can have suitable cold flow properties to allow for use as winter or arctic diesel fuel products. These advantages are enabled in part by using a dewaxing catalyst that is tolerant of sour processing environments while still providing desirable levels of activity for both feed conversion and feed isomerization. In various aspects, the hydrotreating catalyst used for hydrotreating the effluent after exposure to the dewaxing catalyst can include Group VI and/or Group VIII non-noble metals supported on a refractory support, with the support preferably not including zeolites or other molecular sieve type components.

One of the difficulties in processing a heavier feed can be producing a diesel fuel product from an integrated hydrocracking process that meets desired specifications. For example, the cold flow properties of a diesel product generated from conventional hydrocracking methods may be unsuitable for use in the diesel fuel pool, or the cold flow properties may be unsuitable for use as a winter diesel. One option for improving cold flow properties is to use a catalytic dewaxing step. However, conventional catalytic dewaxing catalysts can be sensitive to sour processing environments, such as environments that result from processing of feedstocks that have sulfur and/or nitrogen contaminants in the feedstock. For example, a sour environment can be a reaction environment in which the total combined sulfur levels in liquid and gaseous forms are greater than 1000 ppm by weight relative to the weight of the effluent passed into a reaction stage. To avoid the difficulties in performing conventional dewaxing processes in sour environments, performing a catalytic dewaxing step on a converted diesel fuel product has conventionally required a separation stage located somewhere between hydrotreatment or hydrocracking of the feedstock and the dewaxing stage.

In various aspects, improvements in diesel and/or lube basestock yield can be achieved in part by converting or hydrocracking a feed under effective conversion conditions in the presence of a dewaxing catalyst that is tolerant of sour conditions. Using a dewaxing catalyst for conversion of a feedstock can allow for both conversion of a feedstock to lower boiling point components and isomerization of the feedstock and/or products to improve cold flow properties. In addition to performing conversion on the feedstock, the isomerization of the feedstock can also (in some aspects) reduce the severity needed for a subsequent hydrotreating stage or catalyst bed in order to reduce the sulfur level of the diesel and/or lubricant products to a desired amount, such as 15 wppm of sulfur or less, or 10 wppm of sulfur or less. Having the hydrotreating stage or catalyst bed(s) after the conversion/dewaxing stage or catalyst bed(s) allows for reduced severity in part because some refractory sulfur compounds within a feed can be isomerized to compounds that are easier to desulfurize.

Additionally or alternately, performing conversion by contacting a feedstock with a dewaxing catalyst under effective conversion conditions prior to hydrotreatment can also provide benefits for reducing the aromatics content of lubricant and distillate fuel products. Aromatic saturation processes are controlled at least in part by equilibrium processes between various components within a feedstock. For these equilibrium processes, lower processing temperatures tend to favor reducing the aromatics content of resulting products. A dewaxing stage located after a hydrocracking or hydrotreating stage may often operate at a higher temperature than the prior hydrocracking or hydrotreating stage. As a result, the aromatics content of the products from the dewaxing stage may be higher than is desired. By using a dewaxing catalyst for performing conversion on a feed prior to hydrotreatment, the lower temperature hydrotreatment process can be performed after feed conversion. This can contribute to lower aromatics content in the resulting lubricant and diesel or distillate fuel products formed from hydroprocessing.

The dewaxing catalysts used according to the disclosure can provide an activity advantage relative to conventional dewaxing catalysts in the presence of sulfur-containing feeds. In the context of performing conversion on a feed according to various aspects of the disclosure, a sulfur-containing feed can represent a feed containing at least 100 ppm by weight of sulfur, or at least 1000 ppm by weight of sulfur, or at least 2000 ppm by weight of sulfur, or at least 4000 ppm by weight of sulfur, or at least 40,000 ppm by weight of sulfur. The feed and hydrogen gas mixture can include greater than 1,000 ppm by weight of sulfur or more, or 5,000 ppm by weight of sulfur or more, or 15,000 ppm by weight of sulfur or more. In yet another embodiment, the sulfur may be present in the gas only, the liquid only or both. For the present disclosure, these sulfur levels are defined as the total combined sulfur in liquid and gas forms fed to the conversion or dewaxing stage in parts per million (ppm) by weight on a feedstock basis.

The advantage of being able to process feedstocks in a sour environment can be achieved in part by the use of a catalyst comprising a 10-member ring pore, one-dimensional zeolite in combination with a low surface area metal oxide refractory binder, both of which are selected to obtain a high ratio of micropore surface area to total surface area. Alternatively, the zeolite has a low silica to alumina ratio. As another alternative, the catalyst can comprise an unbound 10-member ring pore, one-dimensional zeolite. The dewaxing catalyst can further include a metal hydrogenation function, such as a Group VIII metal, preferably a Group VIII noble metal. Preferably, the dewaxing catalyst is a one-dimensional 10-member ring pore catalyst, such as ZSM-48 or ZSM-23.

The external surface area and the micropore surface area refer to one way of characterizing the total surface area of a catalyst. These surface areas are calculated based on analysis of nitrogen porosimetry data using the BET method for surface area measurement. (See, for example, Johnson, M. F. L., Jour. Catal., 52, 425 (1978).) The micropore surface area refers to surface area due to the unidimensional pores of the zeolite in the dewaxing catalyst. Only the zeolite in a catalyst will contribute to this portion of the surface area. The external surface area can be due to either zeolite or binder within a catalyst.

In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production and lubricant base oil production while reducing or minimizing the amount of light ends or combined light ends and naphtha generated by the process. The amount of conversion can correspond to the total conversion of molecules within the processing stage. Thus, the amount of conversion can correspond to conversion performed based on both exposure to the dewaxing catalyst and subsequent exposure to the hydrotreating catalyst. Suitable amounts of conversion of molecules boiling above 700° F. to molecules boiling below 700° F. include converting at least 45% of the 700° F.+ portion of the feedstock, such as converting at least 55% of the 700° F.+ portion, or at least 60%, or at least 65%, or at least 70%, or at least 75%. Additionally or alternately, the amount of conversion for the reaction system can be 85% or less, or 80% or less, or 75% or less, or 70% or less. Still larger amounts of conversion may also produce a suitable hydrocracker bottoms for forming lubricant base oils, but such higher conversion amounts will also result in a reduced yield of lubricant base oils. Reducing the amount of conversion can increase the yield of lubricant base oils, but reducing the amount of conversion to below the ranges noted above may result in hydrocracker bottoms that are not suitable for formation of Group II, Group II+, or Group III lubricant base oils.

It is noted that at least a portion of the total conversion may occur during exposure of the feedstock to the subsequent hydrotreatment catalyst bed or beds. For example, exposure of the dewaxed feedstock to the catalyst in the hydrotreating bed(s) under effective conditions may cause 10% to 30% conversion, such as at least 10%, or at least 15%, or at least 20%, and/or such as 30% or less, or 25% or less, or 20% or less. The amount of conversion that occurs during exposure to the dewaxing catalyst can have a corresponding value so that the desired total amount of conversion occurs across all hydroprocessing stages or beds. For example, a total conversion of 55% of the 700° F.+ portion can correspond to a conversion of 45% of the 700° F.+ portion in a dewaxing stage or bed(s) and 10% conversion in the subsequent hydrotreating stage or bed(s). In various aspects, the amount of 700° F.+ conversion in the dewaxing stage or bed(s) can be at least 25%, or at least 35%, or at least 45%, or at least 55%, with the hydrotreating bed(s) optionally providing additional 700° F.+ conversion to reach a desired total conversion amount.

Group I basestocks or base oils are defined as base oils with less than 90 wt % saturated molecules and/or at least 0.03 wt % sulfur content. Group I basestocks also have a viscosity index (VI) of at least 80 but less than 120. Group II basestocks or base oils contain at least 90 wt % saturated molecules and less than 0.03 wt % sulfur. Group II basestocks also have a viscosity index of at least 80 but less than 120. Group III basestocks or base oils contain at least 90 wt % saturated molecules and less than 0.03 wt % sulfur, with a viscosity index of at least 120. In addition to the above formal definitions, some Group I basestocks may be referred to as a Group I+ basestock, which corresponds to a Group I basestock with a VI value of 103 to 108. Some Group II basestocks may be referred to as a Group II+ basestock, which corresponds to a Group II basestock with a VI of at least 113. Some Group III basestocks may be referred to as a Group III+ basestock, which corresponds to a Group III basestock with a VI value of at least 140.

In the discussion below, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In this discussion, unless otherwise specified the lubricant product fraction of a hydroprocessed feedstock corresponds to the fraction having an initial boiling point or alternatively a T5 boiling point of at least 370° C. (700° F.). A distillate fuel product fraction, such as a diesel product fraction, corresponds to a product fraction having a boiling range from 193° C. (375° F.) to 370° C. (700° F.). Thus, distillate fuel product fractions have initial boiling points (or alternatively T5 boiling points) of at least 193° C. and final boiling points (or alternatively T95 boiling points) of 370° C. or less. A naphtha fuel product fraction corresponds to a product fraction having a boiling range from 50° C. (122° F.) to 193° C. (375° F.) to 370° C. (700° F.). Thus, naphtha fuel product fractions have initial boiling points (or alternatively T5 boiling points) of at least 50° C. and final boiling points (or alternatively T95 boiling points) of 193° C. or less. It is noted that 50° C. roughly corresponds to a boiling point for the various isomers of a C6 alkane. Light ends are defined as products with boiling points below 50° C., which include various C1-C5 compounds. When determining a boiling point or a boiling range for a feed or product fraction, an appropriate ASTM test method can be used, such as the procedures described in ASTM D2887 or D86.

Feedstocks

A wide range of petroleum and chemical feedstocks can be hydroprocessed in accordance with the disclosure. Suitable feedstocks include whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil.

Typical feeds include, for example, feeds with an initial boiling point of at least 650° F. (343° C.), or at least 700° F. (371° C.), or at least 750° F. (399° C.). Alternatively, a feed may be characterized using a T5 boiling point, such as a feed with a T5 boiling point of at least 650° F. (343° C.), or at least 700° F. (371° C.), or at least 750° F. (399° C.). In some aspects, the final boiling point of the feed can be 1150° F. (621° C.) or less, such as 1100° F. (593° C.) or less, or 1050° F. (566° C.) or less. Alternatively, a feed may be characterized using a T95 boiling point, such as a feed with a T95 boiling point of 1150° F. (621° C.) or less, or 1100° F. (593° C.) or less, or 1050° F. (566° C.) or less. In still other aspects, the feedstock can correspond to a lower boiling gas oil fraction, with a T95 boiling point or final boiling point of 1000° F. (538° C.) or less, such as 935° F. (500° C.) or less. An example of a suitable type of feedstock is a wide cut vacuum gas oil (VGO) feed, with a T5 boiling point of at least 700° F. (371° C.) and a T95 boiling point of 1100° F. or less, preferably a T95 boiling point of 1000° F. (538° C.)

or less. It is noted that feeds with still lower initial boiling points and/or T5 boiling points may also be suitable, so long as sufficient higher boiling material is available so that the overall nature of the process is a lubricant base oil production process and/or a fuels hydrocracking process.

The above feed description corresponds to a potential feed for producing lubricant base oils. In some aspects, methods are provided for producing both fuels and lubricants. Because fuels are a desired product, feedstocks with lower boiling components may also be suitable. For example, a feedstock suitable for fuels production, such as a light cycle oil, can have a T5 boiling point of at least 350° F. (177° C.), such as at least 400° F. (204° C.). Examples of a suitable boiling range include a boiling range of from 350° F. (177° C.) to 700° F. (371° C.), such as from 390° F. (200° C.) to 650° F. (343° C.). Thus, a portion of the feed used for fuels and lubricant base oil production can include components having a boiling range from 170° C. to 350° C. Such components can be part of an initial feed, or a first feed with a T5 boiling point of at least 650° F. (343° C.) can be combined with a second feed, such as a light cycle oil, that includes components that boil between 200° C. and 350° C.

The sulfur content of the feed can be any convenient amount, but preferably less than 20,000 wppm. In some aspects, the sulfur content of the feedstock can be at least 100 wppm of sulfur, or at least 300 wppm, or at least 1000 wppm, or at least 2000 wppm, or at least 4000 wppm, or at least 10,000 wppm. Additionally or alternatively, the sulfur content can be 5000 wppm or less, or 2000 wppm or less, or 1000 wppm or less, or 500 wppm or less.

In some embodiments, at least a portion of the feed can correspond to a feed derived from a biocomponent source. In this discussion, a biocomponent feedstock refers to a hydrocarbon feedstock derived from a biological raw material component, from biocomponent sources such as vegetable, animal, fish, and/or algae. Note that, for the purposes of this document, vegetable fats/oils refer generally to any plant based material, and can include fat/oils derived from a source such as plants of the genus Jatropha. Generally, the biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof. The biocomponent feeds usable in the present disclosure can include any of those which comprise primarily triglycerides and free fatty acids (FFAs). A triglyceride is a molecule having a structure substantially identical to the reaction product of glycerol and three fatty acids. Thus, although a triglyceride is described herein as being comprised of fatty acids, it should be understood that the fatty acid component does not necessarily contain a carboxylic acid hydrogen. Other types of feed that are derived from biological raw material components can include fatty acid esters, such as fatty acid alkyl esters (e.g., FAME and/or FAEE).

Biocomponent based feedstreams typically have relatively low nitrogen and sulfur contents. For example, a biocomponent based feedstream can contain up to 500 wppm nitrogen, for example up to 300 wppm nitrogen or up to 100 wppm nitrogen. Instead of nitrogen and/or sulfur, the primary heteroatom component in biocomponent feeds is oxygen. Biocomponent diesel boiling range feedstreams, e.g., can include up to 10 wt % oxygen, up to 12 wt % oxygen, or up to 14 wt % oxygen. Suitable biocomponent diesel boiling range feedstreams, prior to hydrotreatment, can include at least 5 wt % oxygen, for example at least 8 wt % oxygen.

Alternatively, a feed of biocomponent origin can be used that has been previously hydrotreated. This can be a hydrotreated vegetable oil feed, a hydrotreated fatty acid alkyl ester feed, or another type of hydrotreated biocomponent feed. A hydrotreated biocomponent feed can be a biocomponent feed that has been previously hydroprocessed to reduce the oxygen content of the feed to 500 wppm or less, for example to 200 wppm or less or to 100 wppm or less. Correspondingly, a biocomponent feed can be hydrotreated to reduce the oxygen content of the feed, prior to other optional hydroprocessing, to 500 wppm or less, for example to 200 wppm or less or to 100 wppm or less. Additionally or alternatively, a biocomponent feed can be blended with a mineral feed, so that the blended feed can be tailored to have an oxygen content of 500 wppm or less, for example 200 wppm or less or 100 wppm or less. In embodiments where at least a portion of the feed is of a biocomponent origin, that portion can be at least 2 wt %, for example at least 5 wt %, at least 10 wt %, at least 20 wt %, at least 25 wt %, at least 35 wt %, at least 50 wt %, at least 60 wt %, or at least 75 wt %. Additionally or alternatively, the biocomponent portion can be 75 wt % or less, for example 60 wt % or less, 50 wt % or less, 35 wt % or less, 25 wt % or less, 20 wt % or less, 10 wt % or less, or 5 wt % or less.

The content of sulfur, nitrogen, and oxygen in a feedstock created by blending two or more feedstocks can typically be determined using a weighted average based on the blended feeds. For example, a mineral feed and a biocomponent feed can be blended in a ratio of 80 wt % mineral feed and 20 wt % biocomponent feed. In such a scenario, if the mineral feed has a sulfur content of 1000 wppm, and the biocomponent feed has a sulfur content of 10 wppm, the resulting blended feed could be expected to have a sulfur content of 802 wppm.

Conversion Conditions and Dewaxing Catalyst

In various aspects, a feedstock having a suitable boiling range, such as a vacuum gas oil feedstock, can be processed by successively contacting the feed with a dewaxing catalyst under effective conversion conditions, and a hydrotreating catalyst under effective hydrotreating conditions. Preferably, the feedstock is exposed to the dewaxing catalyst and the hydrotreating catalyst without intermediate separation, such as by having the catalysts in a single reaction stage or a single reactor. Processing the feed in a single stage can reduce costs associated with producing lubricant and distillate fuel products that also have desired cold flow and/or viscosity properties.

Suitable dewaxing catalysts can include molecular sieves such as crystalline aluminosilicates (zeolites). In an embodiment, the molecular sieve can comprise, consist essentially of, or be ZSM-22, ZSM-23, ZSM-48. Optionally but preferably, molecular sieves that are selective for dewaxing by isomerization as opposed to cracking can be used, such as ZSM-48, ZSM-23, or a combination thereof. Additionally or alternatively, the molecular sieve can comprise, consist essentially of, or be a 10-member ring 1-D molecular sieve, such as EU-2, EU-11, ZBM-30, ZSM-48, or ZSM-23. ZSM-48 is most preferred. Note that a zeolite having the ZSM-23 structure with a silica to alumina ratio of from 20:1 to 40:1 can sometimes be referred to as SSZ-32. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the disclosure are catalysts with a low ratio of silica to alumina. For example, for ZSM-48, the ratio of silica to alumina in the zeolite can be 100:1 or less, such as 90:1 or less, or 75:1 or less, or 70:1 or less. Additionally or alternately, the ratio of silica to alumina in the ZSM-48 can be at least 50:1, such as at least 60:1, or at least 65:1.

In various embodiments, the catalysts according to the disclosure further include a metal hydrogenation component. The metal hydrogenation component is typically a Group VI and/or a Group VIII metal. Preferably, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.5 wt %, or at least 1.0 wt %, or at least 2.5 wt %, or at least 5.0 wt %, based on catalyst. The amount of metal in the catalyst can be 20 wt % or less based on catalyst, or 10 wt % or less, or 5 wt % or less, or 2.5 wt % or less, or 1 wt % or less. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the disclosure can also include a binder. In some embodiments, the dewaxing catalysts used in process according to the disclosure are formulated using a low surface area binder, a low surface area binder represents a binder with a surface area of 100 $m^2/g$ or less, or 80 $m^2/g$ or less, or 70 $m^2/g$ or less. Additionally or alternately, the binder can have a surface area of at least 25 $m^2/g$. The amount of zeolite in a catalyst formulated using a binder can be from 30 wt % zeolite to 90 wt % zeolite relative to the combined weight of binder and zeolite. Preferably, the amount of zeolite is at least 50 wt % of the combined weight of zeolite and binder, such as at least 60 wt % or from 65 wt % to 80 wt %.

Without being bound by any particular theory, it is believed that use of a low surface area binder reduces the amount of binder surface area available for the hydrogenation metals supported on the catalyst. This leads to an increase in the amount of hydrogenation metals that are supported within the pores of the molecular sieve in the catalyst.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

Process conditions for conversion of feedstock in the presence of a dewaxing catalyst can include a temperature of from 300° C. to 450° C., preferably 343° C. to 435° C., a hydrogen partial pressure of from 3.5 MPag to 34.6 MPag (500 psig to 5000 psig), preferably 4.8 MPag to 20.8 MPag, and a hydrogen circulation rate of from 178 $m^3/m^3$ (1000 SCF/B) to 1781 $m^3/m^3$ (10,000 scf/B), preferably 213 $m^3/m^3$ (1200 SCF/B) to 1068 $m^3/m^3$ (6000 SCF/B). The LHSV can be from 0.2 $h^{-1}$ to 10 $h^{-1}$, such as from 0.5 $h^{-1}$ to 5 $h^{-1}$ and/or from 1 $h^{-1}$ to 4 $h^{-1}$.

Hydrotreatment Conditions

After exposure to the dewaxing catalyst under effective conversion conditions, the converted feed can be exposed to a hydrotreating catalyst under effective hydrotreating conditions. The catalysts used can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. More generally, any convenient size, shape, and/or pore size distribution for a catalyst suitable for hydrotreatment of a distillate (including lubricant base oil) boiling range feed in a conventional manner may be used. Preferably, the support or carrier material is an amorphous support, such as a refractory oxide. Preferably, the support or carrier material can be free or substantially free of the presence of molecular sieve, where substantially free of molecular sieve is defined as having a content of molecular sieve of less than 0.01 wt %.

The at least one Group VIII non-noble metal, in oxide form, can typically be present in an amount ranging from 2 wt % to 40 wt %, preferably from 4 wt % to 15 wt %. The at least one Group VI metal, in oxide form, can typically be present in an amount ranging from 2 wt % to 70 wt %, preferably for supported catalysts from 6 wt % to 40 wt % or from 10 wt % to 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this disclosure, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage will preferably contain at least 50 vol. % and more preferably at least 75 vol. % hydrogen.

Hydrogen can be supplied at a rate of from 100 SCF/B (standard cubic feet of hydrogen per barrel of feed) (17 $Nm^3/m^3$) to 1500 SCF/B (253 $Nm^3/m^3$). Preferably, the hydrogen is provided in a range of from 200 SCF/B (34 $Nm^3/m^3$) to 1200 SCF/B (202 $Nm^3/m^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 $hr^{-1}$ to 10 $hr^{-1}$; and hydrogen treat rates of 200 scf/B (35.6 $m^3/m^3$) to 10,000 scf/B (1781 $m^3/m^3$), or 500 (89 $m^3/m^3$) to 10,000 scf/B (1781 $m^3/m^3$).

In some aspects, the hydrotreating conditions can be selected relative to the effective conversion conditions. In addition to performing sulfur and nitrogen removal from the feedstock, the hydrotreating catalyst can also be effective for aromatic saturation. Because aromatic saturation is an equilibrium process, selecting hydrotreating conditions with a lower processing temperature than the conversion conditions can be beneficial for reducing the amount of aromatics, including polynuclear aromatics, in the hydroprocessed products. In such aspects, the hydrotreating conditions can include a temperature that is at least 10° C. lower than the temperature used for the effective conversion conditions, such as at least 15° C. lower or at least 20° C. lower. The temperature between the dewaxing catalyst bed(s) and the hydrotreating catalyst bed(s) can be reduced by any convenient method, such as by introducing a gas phase or liquid phase quench stream into the reaction system between the dewaxing catalyst bed(s) and the hydrotreating catalyst bed(s). Suitable fluids for use as a quench gas or a quench liquid to reduce temperature between catalyst beds include hydrogen, nitrogen, recycled naphtha separated from the effluent of the reaction system, or other recycled portions of the effluent. It is noted that makeup hydrogen to provide additional fresh hydrogen for the hydrotreating conditions can serve as at least a portion of a quench gas. In other aspects, such as aspects where the dewaxing and hydrotreating catalyst beds are located in separate reactors, a heat exchanger can be used to reduce the temperature of the feedstock between the dewaxing and hydrotreating catalyst beds.

Hydrofinishing and/or Aromatic Saturation Process

In some optional aspects, a hydrofinishing and/or aromatic saturation stage can also be provided. The hydrofinishing and/or aromatic saturation stage can occur after the last bed of hydrotreating catalyst. The hydrofinishing and/or aromatic saturation can occur either before or after fractionation. If hydrofinishing and/or aromatic saturation occurs after fractionation, the hydrofinishing can be performed on one or more portions of the fractionated product, such as being performed on the bottoms from the reaction stage (i.e., the hydrocracker bottoms). Alternatively, the entire effluent from the last hydrocracking or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing Typically a hydrofinishing and/or aromatic saturation process will be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction.

Hydrofinishing conditions can include temperatures from 125° C. to 425° C., preferably 180° C. to 280° C., a hydrogen partial pressure from 500 psig (3.4 MPa) to 3000 psig (20.7 MPa), preferably 1500 psig (10.3 MPa) to 2500 psig (17.2 MPa), and liquid hourly space velocity from 0.1 $hr^{-1}$ to 5 $hr^{-1}$ LHSV, preferably 0.5 $hr^{-1}$ to 1.5 $hr^{-1}$. Additionally, a hydrogen treat gas rate of from 35.6 $m^3/m^3$ to 1781 $m^3/m^3$ (200 SCF/B to 10,000 SCF/B) can be used. Optionally but preferably, the temperature in the hydrofinishing stage can be lower than the temperature of the effective hydrotreating conditions.

After hydroprocessing, the bottoms from the hydroprocessing reaction system can have a viscosity index (VI) of at least 95, such as at least 105 or at least 110. The amount of saturated molecules in the bottoms from the hydroprocessing reaction system can be at least 90%, while the sulfur content of the bottoms is less than 300 wppm. Thus, the bottoms from the hydroprocessing reaction system can be suitable for use as a Group II, Group II+, or Group III lubricant base oil.

Lubricant and Distillate Fuel Products

After exposing a feedstock to the dewaxing catalyst and the hydrotreating catalyst (and optionally a hydrofinishing catalyst), the resulting effluent can be separated and/or fractionated to form a plurality of products. Optionally, a first separation can be performed on the effluent to remove light ends and gas phase contaminants, such as $H_2S$ and $NH_3$ generated during the conversion and hydrotreatment processes. The effluent can then be fractionated using one or more separation or fractionation stages to form at least one lubricant product, at least one distillate fuel product, and a naphtha product. The at least one lubricant product can correspond to one or more lubricant base oil products having different viscosities. For example, if more than one lubricant base oil product is desired, the fractionation can be used to form lubricant base oil products with viscosities of less than 4 cSt @ 100° C., between 4 and 6 cSt @ 100° C., and greater than 6 cSt @ 100° C. Other choices for selecting viscosities for a plurality of lubricant base oil products can also be used. The at least one distillate fuel product can correspond to a diesel fuel product; a winter diesel fuel product; a kerosene product; a heavy diesel product (optionally a winter diesel) having an initial boiling point or a T5 boiling point of at least 550° F. (288° C.), such as at least 600° F. (316° C.); a light diesel product (optionally a winter diesel) having an end boiling point or a T95 boiling point of 600° F. (316° C.) or less, such as 550° F. (288° C.) or less; or a combination thereof.

In various aspects, exposing a feedstock to the dewaxing catalyst and the hydrotreating catalyst produces an effluent that includes a reduced or minimized amount of light ends and naphtha products, so that the amount of distillate fuel and lubricant products are increased. This can correspond to an increase in the amount of distillate fuel products relative to a conventional process, an increase in the amount of lubricant products relative to a conventional process, or a combination thereof. For example, the combined yield of naphtha and light ends products in the effluent can be 24 wt % or less, such as 22 wt % or less, and preferably 21 wt % or less.

In various aspects, the distillate fuel product(s) in the effluent can correspond to distillate product(s) suitable for use as a winter diesel. The distillate product(s) can have a cloud point of −20° C. or less, such as −25° C. or less, or −30° C. or less. Optionally, the cloud point can be at least −100° C. In various aspects, a diesel product (such as a winter diesel product) can have a cetane rating of at least 55, such as at least 60. In various aspects, the sulfur content of a distillate fuel product and/or a diesel product can be 15 wppm or less, such as 10 wppm or less, or 5 wppm or less.

In various aspects, the lubricant product(s) can have a pour point of −15° C. or less, such as −18° C. or less, or −20° C. or less. Optionally, the pour point can be at least −70° C. Additionally or alternately, the pour point reduction for the lubricant product(s) relative to the feedstock can be a pour point reduction of at least 50° C., such as at least 60° C., or at least 70° C. Optionally, the pour point reduction can be 120° C. or less.

In various aspects, the lubricant product(s) can have a viscosity index of at least 103, such as at least 110, or at least 113, or at least 120. Optionally, the viscosity index of the lubricant product(s) can be 160 or less. In various aspects, the lubricant product(s) can have a reduced or minimized content of aromatics relative to a conventionally produced lubricant product. The aromatics content of the lubricant product(s) can be 25 µmole/g or less, such as 20 µmole/g or less, or 15 µmole/g or less. Additionally or alternately, the content of aromatics having 3 or more rings can be 1 µmole/g or less, such as 0.8 µmole/g or less, or 0.6 µmole/g or less. Preferably, the desired aromatics content and/or content of aromatics having 3 or more rings is achieved prior to any optional hydrofinishing of the effluent from exposure to the dewaxing and hydrotreating catalysts.

EXAMPLES

In the following examples, a vacuum gas oil boiling range feedstock was hydroprocessed using two different configurations. In the first example, a conventional catalyst order was used, so that the feedstock was exposed first to a hydrotreating catalyst. The resulting hydrotreated effluent was exposed without separation to a dewaxing catalyst. In the second example, the same catalysts were used, but the feed was exposed first to the dewaxing catalyst, followed by exposure (without separation) to the hydrotreating catalyst. The examples show results from a reaction system with two reactors, with one reactor containing the hydrotreating catalyst and the other reactor containing the dewaxing catalyst. However, because no intermediate separation was performed, the results correspond to processing in a single reaction stage and therefore the results are believed to be representative of performing the process in a single reactor.

The dewaxing (HDW) catalyst used in the examples was a Ni (3 wt %) and W (12 wt %) promoted ZSM-48 (70:1 Si/Al ratio) catalyst prepared with a low surface area alumina as binder (35 wt % binder prior to the NiW addition). The hydrotreating (HDT) catalyst used in the examples was a commercial high activity $NiMo/Al_2O_3$ catalyst.

The operating conditions used for the reaction system are shown in Table 1.

TABLE 1

Experimental Conditions

| | | Example-1 | Example-2 |
|---|---|---|---|
| Configuration | | HDT/HDW | HDW/HDT |
| HDW Temperature | ° C. | 381 | 385 |
| HDT Temperature | ° C. | 350 | 350 |
| HDW LHSV | $Hr^{-1}$ | 2.2 | 2.0 |
| HDT LHSV | $Hr^{-1}$ | 1 | 0.9 |
| Pressure | barg | 115.6 | 115.6 |
| Treat Gas Rate | $Nm^3/m^3$ | 422 | 422 |
| Treat Gas $H_2$ Purity | % | 100 | 100 |

The feed used in the examples was a vacuum gas oil. Representative properties of the vacuum gas oil feed used in the examples are shown in Table 2.

TABLE 2

Feed Properties

| | | |
|---|---|---|
| Density @ 70° C. | g/cc | 0.8138 |
| Sulfur | ppmw | 8420 |
| Nitrogen | ppmw | 61 |
| Pour Point | ° C. | >50 |
| Distillation (D2887) | | |
| IBP | ° C. | 338 |
| 10% | ° C. | 380 |
| 50% | ° C. | 415 |
| 90% | ° C. | 445 |
| EBP | ° C. | 474 |
| Total Aromatic by UV | µmole/g | 612.12 |
| $3^+$ ring Aromatics by UV | µmole/g | 64.14 |

Table 3 shows the results of processing the vacuum gas oil feedstock shown in Table 2 according to the two different reaction system configurations.

TABLE 3

Process Yields and Product Quality Comparison

|  |  | Example-1 | Example-2 |
|---|---|---|---|
| Catalyst Configuration |  | HDT/HDW | HDW/HDT |
| Process Yields |  |  |  |
| C1-C5 | Wt % | 9 | 6 |
| Naphtha (C6-193° C.) | Wt % | 16 | 14 |
| Diesel (193-370° C.) | Wt % | 35 | 36 |
| Lube (370° C.+) | Wt % | 41 | 45 (43 @ −20° C. Pour) |
| Lube (370° C.+) Properties |  |  |  |
| Pour Point | ° C. | −20 | −15 (−20) |
| KV@40° C. | st | 18.3 | 18.4 |
| KV@100° C. | st | 4.0 | 4.0 |
| Viscosity Index |  | 111 | 113.7 (112 @−20° C. Pour) |
| Total Aromatics by UV | μmole/g | 78.6 | 19.2 |
| 3+ Ring Aromatics | μmole/g | 4.9 | 0.8 |
| Sulfur | ppmw | 5.0 | <3 |
| Diesel (193-370° C.) Properties |  |  |  |
| Sulfur | ppmw | 12.4 | 3.1 |
| Cloud Point | ° C. | −41 | −31 |
| Cetane Index |  | 60 | 61 |

As shown in Table 3, the HDW/HDT catalyst configuration in Example 2 (according to the disclosure) produced more lubricant product (43 vs. 41 wt % based on feed at −20° C. pour point of the lube product) but less naphtha and light gases while the diesel yields were similar. For fixed reaction conditions, the configuration according to the disclosure produced 45 wt % of lubricant product versus 41 wt % for the conventional configuration. This result can be adjusted to allow comparison at equivalent pour point, which resulted in a yield advantage of 43 wt % versus 41 wt %. Either of these increased yields represents an unexpected benefit achieved by modifying the conventional reaction order for the catalysts. In addition, the inventive configuration produced more than 35 wt % diesel yield at a conversion level of the 370° C.+ fraction of the feedstock of at least 55%. Thus, the inventive catalyst system is attractive for the co-production of lube base oils and premium diesel fuels. It is noted that the resulting diesel product also had a cloud point of −31° C., which is suitable for use as a winter diesel.

At −20° C. pour point, the 370° C.+ lube fractions from both catalyst configurations were premium base oils with at least 111 VI (viscosity index). However, the configuration according to the disclosure provided a substantially and unexpectedly lower aromatics content. The configuration according to the disclosure also provided a lubricant product with a lower sulfur content.

Similarly, diesel quality for the configuration according to the disclosure was superior to that for the comparative case in terms of sulfur content and cetane index. The diesel from the configuration according to the disclosure satisfied a <10 ppmw sulfur specification for ultra low sulfur diesel.

ADDITIONAL EMBODIMENTS

Embodiment 1

A method for producing a diesel fuel and a lubricant basestock, comprising: contacting a feedstock having a T95 boiling point of 1100° F. (593° C.) or less and comprising at least 100 wppm of sulfur with a dewaxing catalyst under effective conversion conditions to produce a converted effluent, the effective conversion conditions being effective for at least 25% conversion of the feedstock relative to a conversion temperature of 370° C., such as at least 35% conversion or at least 45% conversion, the dewaxing catalyst comprising a unidimensional, 10-member ring pore molecular sieve, at least one Group VI metal, at least one Group VIII metal, and a binder having a binder surface area of 100 m²/g or less, such as 80 m²/g or less, or 70 m²/g or less; contacting at least a portion of the converted effluent with a supported hydrotreating catalyst under effective hydrotreating conditions to produce a product effluent, the hydrotreating catalyst comprising at least one Group VI metal and at least one Group VIII metal; and fractionating the converted, hydrotreated effluent to form at least a distillate fuel product fraction and a lubricant base oil product fraction.

Embodiment 2

The method of Embodiment 1, wherein the support for the supported hydrotreating catalyst is substantially free of molecular sieve, the support for the supported hydrotreating catalyst is an amorphous support, or a combination thereof.

Embodiment 3

The method of any of the above embodiments, further comprising mixing the converted effluent with a quench fluid prior to contacting the converted effluent with the supported hydrotreating catalyst, the effective hydrotreating conditions preferably comprising a temperature at least 10° C. lower than the effective conversion conditions, such as at least 15° C. lower, or at least 20° C. lower.

Embodiment 4

The method of Embodiment 1 or 2, wherein the converted effluent is cascaded to said exposing to the hydrotreating catalyst under effective hydrotreating conditions without intermediate separation.

Embodiment 5

The method of any of the above embodiments, wherein the total conversion of the feedstock, relative to a conversion temperature of 370° C., to form the hydrotreated effluent is at least 45%, such as at least 55%, or at least 65%.

Embodiment 6

The method of any of the above embodiments, wherein the molecular sieve is EU-1, NU-87, ZSM-22, EU-2, EU-11, ZBM-30, ZSM-48, ZSM-23, or a combination thereof, preferably ZSM-48, ZSM-23, or a combination thereof, and more preferably ZSM-48 with a silica to alumina ratio of 90:1 or less, preferably 75:1 or less.

Embodiment 7

The method of any of the above embodiments, wherein the dewaxing catalyst binder comprises silica, alumina, titania, zirconia, silica-alumina, or a combination thereof, the dewaxing catalyst preferably comprising a micropore surface area to total surface area ratio of greater than or equal to 25%, and wherein the total surface area equals the surface area of the external zeolite plus the surface area of the binder.

Embodiment 8

The method of any of the above embodiments, wherein the dewaxing catalyst comprises Ni as the at least one Group VIII metal and Mo, W, or a combination thereof as the at least one Group VI metal.

Embodiment 9

The method of any of the above embodiments, wherein the feedstock comprises at least 1000 wppm of sulfur, wherein the feedstock has a T95 boiling point of 1000° F. (538° C.) or less, or a combination thereof.

Embodiment 10

The method of any of the above embodiments, wherein the hydrotreating catalyst comprises Ni as the at least one Group VIII metal and Mo, W, or a combination thereof as the at least one Group VI metal.

Embodiment 11

The method of any of the above embodiments, further comprising hydrofinishing at least a portion of the product effluent, the distillate fuel product fraction, the lubricant product fraction, or a combination thereof.

Embodiment 12

The method of any of the above embodiments, wherein the effective conversion conditions comprise a temperature of 300° C. to 450° C., preferably 343° C. to 435° C., a hydrogen partial pressure of from 3.5 MPag to 34.6 MPag (500 psig to 5000 psig), preferably 4.8 MPag to 20.8 MPag, a hydrogen circulation rate of from 178 m$^3$/m$^3$ (1000 SCF/B) to 1781 m$^3$/m$^3$ (10,000 scf/B), preferably 213 m$^3$/m$^3$ (1200 SCF/B) to 1068 m$^3$/m$^3$ (6000 SCF/B), and an LHSV from 0.2 hr$^{-1}$ to 10 hr$^{-1}$, preferably from 0.5 hr$^{-1}$ to 5 hf$^{-1}$.

Embodiment 13

The method of any of the above embodiments, wherein the effective hydrotreating conditions comprise a temperature of 200° C. to 450° C., preferably 315° C. to 425° C., pressures of 250 psig (1.8 MPag) to 5000 psig (34.6 MPag), preferably 300 psig (2.1 MPag) to 3000 psig (20.8 MPag), liquid hourly space velocities (LHSV) of 0.1 hr$^{-1}$ to 10 hr$^{-1}$, preferably 0.1 hr$^{-1}$ to 10 hr$^{-1}$, and hydrogen treat rates of 200 scf/B (35.6 m$^3$/m$^3$) to 10,000 scf/B (1781 m$^3$/m$^3$), preferably 500 (89 m$^3$/m$^3$) to 10,000 scf/B (1781 m$^3$/m$^3$).

Embodiment 14

The method of any of the above embodiments, wherein the distillate fuel product fraction comprises a diesel product fraction with a cetane index of at least 50, a cloud point of −20° C. or less, or a combination thereof.

Embodiment 15

The method of any of the above embodiments, wherein the lubricant product fraction has a viscosity index of at least 110, a content of aromatics having three or more rings of 1.0 μmole/g or less, or a combination thereof.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A method for producing a diesel fuel and a lubricant basestock, comprising:
   contacting a feedstock having a T95 boiling point of 1100° F. (593° C.) or less and comprising at least 100 wppm of sulfur with a dewaxing catalyst under effective conversion conditions, prior to exposing the feedstock to a hydrotreating catalyst, to produce a converted effluent, the effective conversion conditions being effective for at least 25% conversion of the feedstock relative to a conversion temperature of 370° C., the dewaxing catalyst comprising a unidimensional, 10-member ring pore molecular sieve, at least one Group VI metal, at least one Group VIII metal, and a binder having a binder surface area of 100 m$^2$/g or less, wherein the effective conversion conditions comprise a temperature of 350° C. to 450° C., a hydrogen partial pressure of from 11.5 MPag to 34.6 MPag (1662 psig to 5000 psig), a hydrogen circulation rate of from 445 m$^3$/m$^3$ (2500 SCF/B) to 1781 m$^3$/m$^3$ (10,000 scf/B), and an LHSV from 0.2 hr$^{-1}$ to 1 hr$^{-1}$;
   contacting at least a portion of the converted effluent with a supported hydrotreating catalyst under effective hydrotreating conditions to produce a product effluent, the hydrotreating catalyst comprising at least one Group VI metal and at least one Group VIII metal; and
   fractionating the converted, hydrotreated effluent to form at least a distillate fuel product fraction and a lubricant base oil product fraction,
   wherein the distillate fuel product fraction comprises a diesel product fraction with a sulfur content of less than or equal to 12.4 ppmw.

2. The method of claim 1, wherein the support for the supported hydrotreating catalyst is substantially free of molecular sieve, the support for the supported hydrotreating catalyst is an amorphous support, or a combination thereof.

3. The method of claim 1, wherein the binder has a binder surface area of 80 m$^2$/g or less.

4. The method of claim 1, further comprising mixing the converted effluent with a quench fluid prior to contacting the converted effluent with the supported hydrotreating catalyst.

5. The method of claim 1, wherein the effective hydrotreating conditions include a temperature at least 10° C. lower than the effective conversion conditions.

6. The method of claim 1, wherein the molecular sieve is EU-1, NU-87, ZSM-22, EU-2, EU-11, ZBM-30, ZSM-48, ZSM-23, or a combination thereof.

7. The method of claim 1, wherein the molecular sieve is ZSM-48, ZSM-23, or a combination thereof.

8. The method of claim 1, wherein the molecular sieve is ZSM-48 with a silica to alumina ratio of 90:1 or less.

9. The method of claim 1, wherein the dewaxing catalyst binder comprises silica, alumina, titania, zirconia, silica-alumina, or a combination thereof.

10. The method of claim 9, wherein the dewaxing catalyst comprises a micropore surface area to total surface area ratio of greater than or equal to 25%, wherein the total surface area equals the surface area of the external zeolite plus the surface area of the binder.

11. The method of claim 1, wherein the dewaxing catalyst comprises Ni as the at least one Group VIII metal and Mo, W, or a combination thereof as the at least one Group VI metal.

12. The method of claim 1, wherein the feedstock comprises at least 1000 wppm of sulfur, the feedstock has a T95 boiling point of 1000° F. (538° C.) or less, or a combination thereof.

13. The method of claim 1, wherein the total conversion of the feedstock, relative to a conversion temperature of 370° C., to form the hydrotreated effluent is at least 45%.

14. The method of claim 1, wherein the hydrotreating catalyst comprises Ni as the at least one Group VIII metal and Mo, W, or a combination thereof as the at least one Group VI metal.

15. The method of claim 1, further comprising hydrofinishing at least a portion of the product effluent, the distillate fuel product fraction, the lubricant product fraction, or a combination thereof.

16. The method of claim 1, wherein the effective hydrotreating conditions comprise a temperature of 200° C. to 450° C., a pressure of 250 psig (1.8 MPag) to 5000 psig (34.6 MPag), a liquid hourly space velocity (LHSV) of 0.1 $hr^{-1}$ to 10 $hr^{-1}$, and a hydrogen treat rate of 200 scf/B (35.6 $m^3/m^3$) to 10,000 scf/B (1781 $m^3/m^3$).

17. The method of claim 1, wherein the converted effluent is cascaded to said exposing to the hydrotreating catalyst under effective hydrotreating conditions without intermediate separation.

18. The method of claim 1, wherein the diesel product fraction has a cetane index of at least 50, a cloud point of −20° C. or less, or a combination thereof.

19. The method of claim 1, wherein the lubricant product fraction has a viscosity index of at least 110, a content of aromatics having three or more rings of 1.0 μmole/g or less, or a combination thereof.

* * * * *